United States Patent [19]
Hehmann

[11] Patent Number: 6,081,635
[45] Date of Patent: *Jun. 27, 2000

[54] MICROOPTICAL MODULE WITH A WDM FILTER AND AN OPTICAL ISOLATOR FOR FIBER-OPTIC AMPLIFIER SYSTEMS

[75] Inventor: Jörg Hehmann, Nürnberg, Germany

[73] Assignee: Alcatel, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/099,094

[22] Filed: Jun. 18, 1998

[30] Foreign Application Priority Data

Jun. 18, 1997 [DE] Germany .......................... 197 25 720

[51] Int. Cl.[7] ............................. G02B 6/28; G02B 5/30
[52] U.S. Cl. .............................. 385/24; 385/52; 359/494; 359/498
[58] Field of Search ................................. 385/15, 24, 27, 385/42, 11, 52; 359/484, 483–485, 494–498

[56] References Cited

U.S. PATENT DOCUMENTS

| 5,768,005 | 6/1998 | Cheng et al. ........................... 359/281 |
| 5,808,793 | 9/1998 | Chang et al. ........................... 359/484 |

FOREIGN PATENT DOCUMENTS

| 0 054 411 | 10/1985 | European Pat. Off. . |
| 0054411 | 10/1985 | European Pat. Off. . |
| 0489315 | 6/1992 | European Pat. Off. . |
| 0492850 | 7/1992 | European Pat. Off. . |
| 0 653 661 | 5/1995 | European Pat. Off. . |
| 0653661 | 5/1995 | European Pat. Off. . |
| 0418423 | 2/1996 | European Pat. Off. . |
| 0707230 | 4/1996 | European Pat. Off. . |
| 0723170 | 7/1996 | European Pat. Off. . |
| 0785456 | 7/1997 | European Pat. Off. . |

*Primary Examiner*—John D. Lee
*Assistant Examiner*—Michelle R. Connelly-Cushwa
*Attorney, Agent, or Firm*—Ware, Fressola, Van Der Sluys & Adolphson LLP

[57] ABSTRACT

The invention relates to an optical isolator of the type commonly employed in fiber-optic data transmission and amplifier systems. The optical isolator of the invention has a support (TR) which is provided with a recess (A). Two wedge-shaped plates (KP1, KP2) made of an optically birefringent material and a Faraday rotator (FR) are inserted in this recess (A). Preferably, the support (TR) is a silicon crystal in which a very precise recess (A) can be formed by wet-chemical etching. The individual components are passively adjusted in the recess by stops. The optical isolator of the invention therefore consists only of those components which are absolutely essential for its operation. Also provided is an advantageous wavelength multiplexer module with an integrated optical isolator. The construction of the wavelength multiplexer module is very simple and requires only two spherical lenses as imaging elements for three optical inputs/outputs.

13 Claims, 2 Drawing Sheets

6,081,635

MICROOPTICAL MODULE WITH A WDM FILTER AND AN OPTICAL ISOLATOR FOR FIBER-OPTIC AMPLIFIER SYSTEMS

TECHNICAL FIELD

The invention relates to an optical isolator with two wedge-shaped plates of an optically birefringent material and a Faraday rotator disposed therebetween. The invention also relates to a wavelength multiplexer module with an integrated optical isolator.

BACKGROUND OF INVENTION

Optical isolators are required in particular in fiber-optic data transmission systems. The optical isolators are intended to prevent light reflected or diffracted at interfaces from impinging on optically active components, for example laser diodes or optical fiber amplifiers, and adversely affecting their operation.

An optical isolator is known from EP-B1-0 054 411. The optical isolator described therein essentially contains two wedge-shaped plates of an optically birefringent material, with a Faraday rotator disposed therebetween. The operation of the optical isolator is based on the observation that a parallel light beam impinging on the isolator from one side leaves the isolator as a parallel light beam on the other side, at which point the light can then be coupled into an optical waveguide by a lens. On the other hand, parallel light which impinges on the isolator from the other side, leaves the isolator as a divergent beam which cannot be coupled back in again if the optical waveguide and the imaging optics are arranged accordingly.

The optical isolator described in the above referenced patent document is independent of the polarization of the impinging light and is therefore particularly suited for applications in data transmission system with conventional non-polarization maintaining fibers. However, since light can be coupled into optical fibers only if the position of the respective imaging elements is precisely adjusted, the individual components of conventional optical isolators require complex active adjustments. The term "active adjustment" describes a process whereby the components have to be arranged and positioned in the optical light path until the light beam has the desired properties. This procedure is usually very time-consuming and labor-intensive; a measuring device has to be continuously monitored while the components are adjusted with the help of extremely accurate positioning devices. Because the high costs associated with this procedure, optical isolators of this type continue to be quite expensive and hinder the migration of fiber-optic data transmission systems to the end user.

SUMMARY OF THE INVENTION

It is therefore the task of the invention to provide an optical isolator composed of a small number of components which do not require active adjustments. The optical isolator of the invention should have a very small footprint, while retaining mechanical stability. Moreover, the optical isolator should form the basis for an optically isolating wavelength multiplexer module with a minimum number of components and which can therefore be manufactured cost-effectively.

The invention solves this task by an optical isolator with two wedge-shaped plates of an optically birefringent material and a Faraday rotator disposed therebetween, wherein the plates and the Faraday rotator are arranged on a support provided with a recess and that the wedge-shaped plates and the Faraday rotator are inserted in the recess so as to be passively adjusted through stops. The adjustment is passive relying on stops, so that the individual components no longer have to be aligned relative to each other by complex alignment procedures. Moreover, with the arrangement of the invention, no additional components are necessary to fix the relative position of the individual optical components (mounts, guide pins, etc.). The optical isolator of the invention can therefore be built from a small number of components. The support used to define the position of the optical components can also be used to support additional components. The optical isolator of the invention can thus perform additional functions enhancing its performance.

One example for a functional unit of this type is a wavelength multiplexer module with an optical isolator as described above.

Another embodiment of a wavelength multiplexer module that comprises an additional adjusting element which is also inserted in the recess. With this adjusting element, the optical isolator can be adjusted in a single adjusting step, even if the manufacturing tolerances are less tight.

BRIEF DESCRIPTION OF THE DRAWINGS

The invention will be described hereinafter with reference to the embodiments and the drawings. It is shown in.

BEST MODE FOR CARRYING OUT THE INVENTION

Figure 1A:
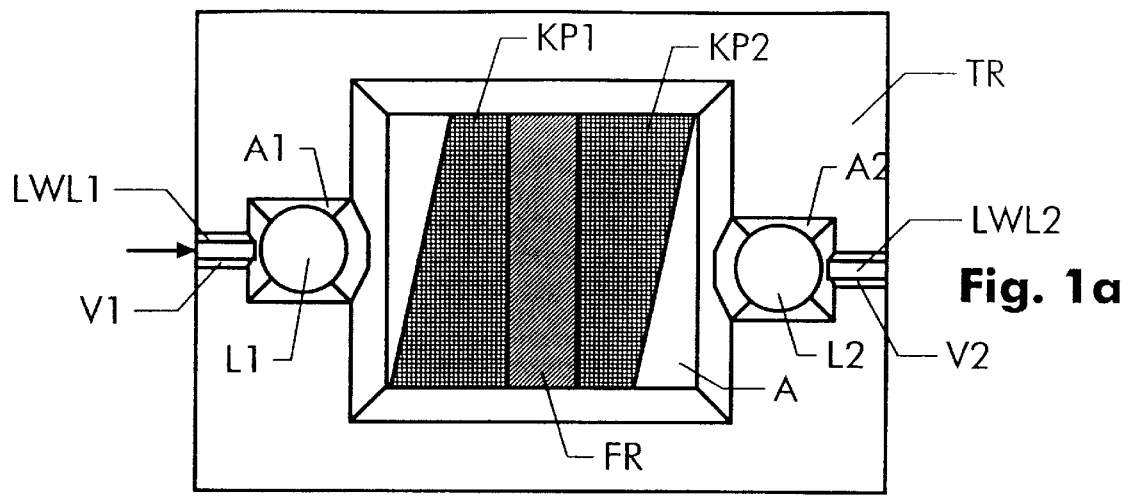
FIG. 1a a top view of an optical isolator of the invention according to claim 1, FIG. 1b a side view of an optical isolator of the invention according to claim 1, FIG. 2 a top view of a wavelength multiplexer module of the invention according to claim 9 with an integrated two-stage optical isolator, FIG. 3 beam path for a wavelength multiplexer module illustrated in FIG. 2, and FIG. 4 beam path for a wavelength multiplexer module illustrated in FIG. 2, wherein the optical isolator transmits in the opposite direction as that of FIG. 3.
Figure 1B:
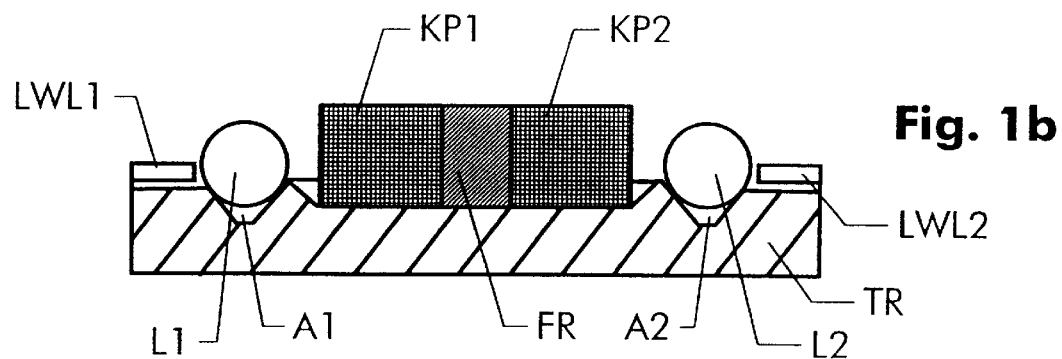

FIGS. 1a and 1b depict a top view and a side view, respectively, of an optical isolator of the invention. The optical isolator is constructed on a support TR which is provided with a recess A. The material for the support can also be provided with a microstructure. This includes materials which can be machined—by suitable methods—to an accuracy of about one micrometer. Such machining accuracy is presently possible for semiconductor crystals, plastics and also for ceramics. In a preferred embodiment of the invention, the support is a silicon crystal. In this case, the recess in the crystal is preferably wet-etched. These etching methods are described, for example, in EP-B1-0 418 423.

Two wedge-shaped plates made of an optically birefringent material KP1 and KP2 and a Faraday rotator are inserted in the recess A. The orientation of the individual components with respect to each other is illustrated in FIG. 1a, i.e. the Faraday rotator is disposed between the wedge-shaped plates. The plates themselves are oriented so that the three components are arranged as to have a point symmetry. The operation of the wedge-shaped plates and of the Faraday rotator is discussed extensively in the patent document EP-B1-0 054 411 referenced above. In the illustrated embodiment, the underside of the wedge-shaped plates and the bottom face of the recess A are flat, i.e. the wedge-shaped plates make face-to-face contact with the bottom face of the recess. However, other designs of the bottom face and the underside of the plates also feasible. For example, plastic supports can be injection molded wherein the bottom faces have ribs. The upwardly pointing edges of these ribs then support the wedge-shaped plates.

The recess and the components to be inserted therein have to be designed in such a way that the components are passively adjusted in the recess through stops. An adjustment is usually referred to as being passive if the final relative position of the components to be adjusted is determined only by their geometrical dimensions. In this case, the components make contact with each other only at individual points ("point contact"), along lines ("edge contact") or across surface sections ("area contact"). In the embodiment of FIG. 1, the position is fixed by edge contacts. The edges are created at the transition between the flat bottom surface of the recess and the inclined lateral boundary surfaces of the recess. When the components to be inserted are machined with sufficient accuracy, then the components can be inserted in the recess A practically without any play.

As illustrated in FIG. 1a, an optical fiber LWL1 and LWL2 is arranged on each side of the optical isolator on the support TR. The optical fibers LWL1 and LWL2 are inserted into V-shaped grooves V1 and V2 so that their positions are precisely fixed. Two spherical lenses L1 and L2 which are positioned directly in front of the ends of the two optical fibers LWL1 and LWL2, form imaging elements. The spherical lenses L1 and L2 in this embodiment are also adjusted passively through point stops. The lenses are here inserted in pyramidal recesses A1 and A2. It will be understood by those skilled in the art that lenses other than spherical lenses can also be employed, such as aspherical or cylindrical lenses.

Figure 2:
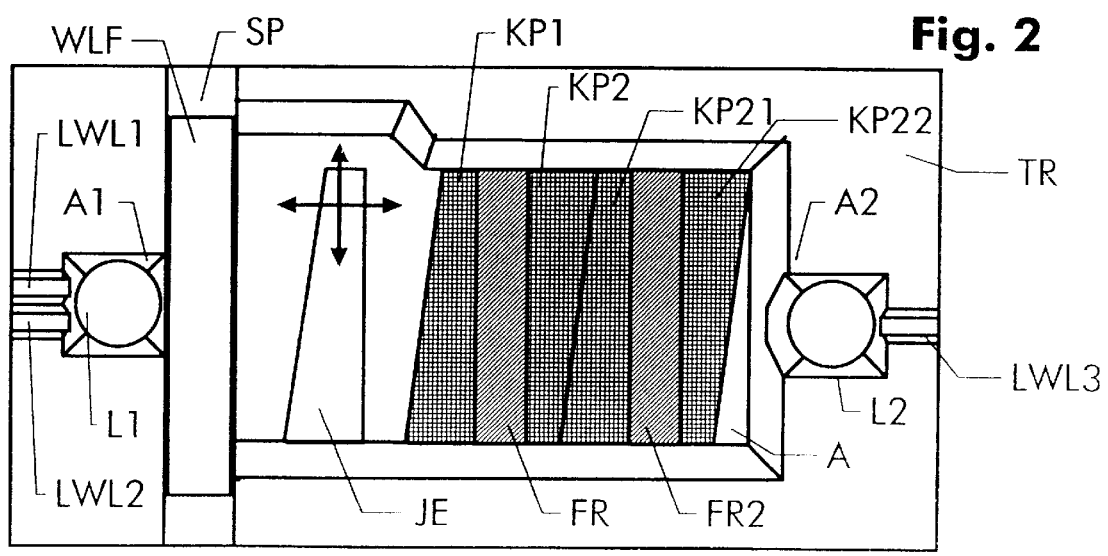

Illustrated in FIG. 2 is a particularly advantageous embodiment of the optical isolator of the invention, namely a wavelength multiplexer module with an integrated optical isolator. Wavelength multiplexer modules of this type are used, for example, in optical fiber amplifier systems to pump light into an optical fiber. The pump light has a wavelength which is different from the wavelength of the light which is guided in the fiber and intended for data transmission. The wavelength multiplexer modules of this type which are described, for example, in EP-A2-0 723 170 and EP-A3-0 492 850, employ as the actual multiplexer element wavelength filters which are transparent for light of a first wavelength and reflect light of a second wavelength.

The wavelength multiplexer module of the invention according to FIG. 2 is based on the optical isolator illustrated in FIGS. 1a and 1b. To improve the optical isolation, the -optical isolator of FIG. 2 has two stages, i.e. the optical isolator consists of two individual optical isolators which are arranged directly in sequence and are constructed in a manner described above. The first optical isolator includes the wedge-shaped plates KP1 and KP2 and the Faraday rotator FR, whereas the second optical isolator includes the wedge-shaped plates KP21 and KP22 and the Faraday rotator FR2.

In addition to the two-stage optical isolator, a wavelength filter WLF is also arranged on the support TR. To define the position of the wavelength filter WLF relative to the other optical components, the wavelength filter is inserted in a slot-like recess SP. This recess is disposed between the optical isolator and the spherical lens L1. If the support is a silicon crystal, then the recess SP can be fabricated, for example, by a saw cut.

On the side of the assembly facing the wavelength filter, there is disposed a first and a second optical waveguide LWL1 and LWL2, respectively. According to the invention, only a single lens is required as imaging element for both optical waveguides. The beam path and the operation of this assembly will now be explained with reference to FIG. 3. Light of a first wavelength $\lambda_1$ is guided in a first optical waveguide LWL1. This light exits from opening of the first waveguide LWL1 and is collimated by a lens L1 placed in front of the first waveguide. This lens is preferably a spherical lens; it would also be feasible to use an aspherical lens. The collimated beam then impinges on the wavelength filter WLF. On the side of the wavelength filter WLF facing the lens there is deposited a multi-layered structure WLFS providing the actual filtering. Light of the wavelength $\lambda_1$ is reflected by the multi-layered structure WLFS. The reflected beam again impinges on the lens L1 which focuses the reflected beam on the opening of the second optical waveguide LWL2.

Light of a second wavelength $\lambda_2$ which is different from the wavelength $\lambda_1$, is guided in the second optical waveguide LWL2. This light exits from the opening of the optical waveguide LWL2 and is also collimated by the lens L1. The collimated beam impinges on the wavelength filter WLF which is transparent for light of the second wavelength $\lambda_2$. The light beam then reaches the adjusting element JE and propagates further to the components of the optical isolator ISOL. The beam is focused by the lens L2 onto the opening of a third optical waveguide LWL3.

Figure 4:
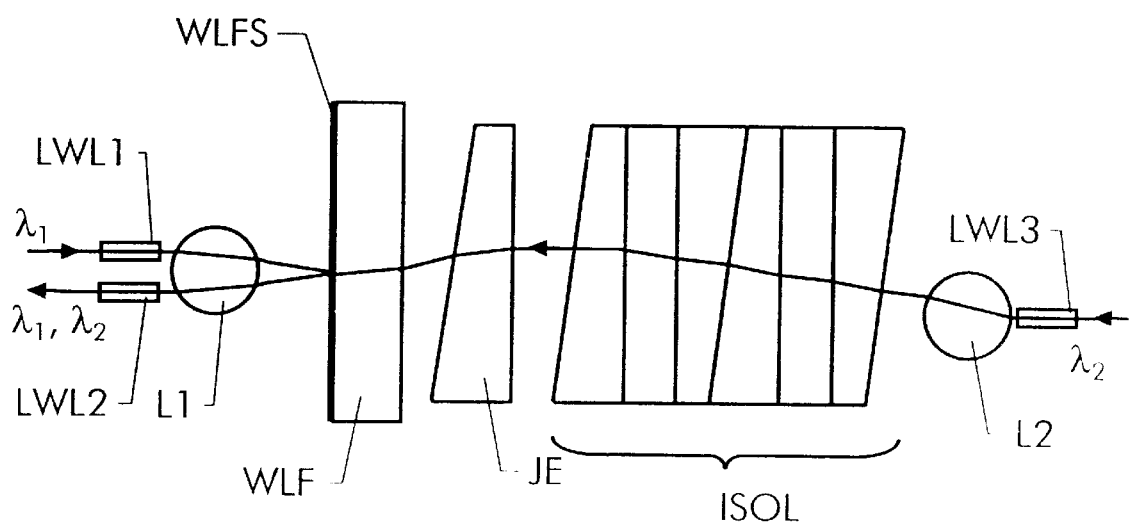

It is also feasible and may be useful depending on the application of the wavelength multiplexer module if the light of the second wavelength $\lambda_2$ does not exit from the second optical waveguide LWL2, but rather from the third optical waveguide LWL3. The corresponding beam path is illustrated in FIG. 4. In this case, the optical isolator has to be mounted so as to transmit in the opposite direction. The light of the second wavelength $\lambda_2$ then travels in the opposite direction, i.e. the light passes first through the optical isolator ISOL and subsequently through the wavelength filter WLF.

Figure 3:
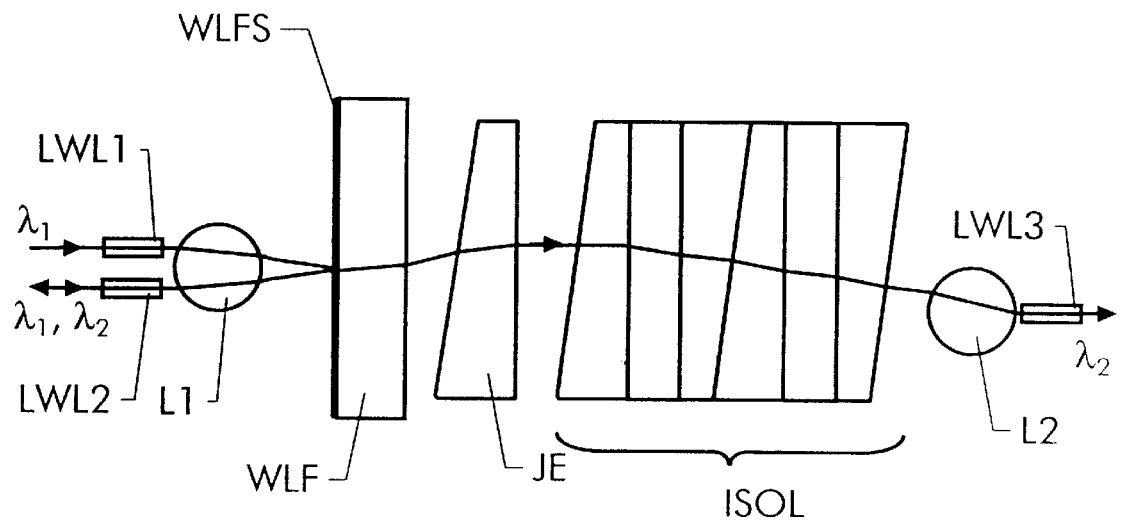

With the assembly technique of the invention, the wavelength multiplexer module illustrated in FIGS. 3 and 4 can be assembled without any active adjusting steps. Certain materials, however, have unavoidable manufacturing tolerances which can adversely affect an error-free operation of the optical isolator. In another embodiment of the invention, an additional adjusting element JE is then provided in the recess A. The adjusting element JE is positioned in the beam path of the optical isolator and is movable in at least one direction. The shape of the adjusting element JE has to be selected so that the beam path moves when the adjusting element moves. In the embodiments depicted in FIGS. 2, 3 and 4, the adjusting element JE is wedge-shaped and can be moved both parallel and perpendicular to the direction of the optical axis. Consequently, the optical isolator can be adjusted in a single adjusting step. The individual components can be permanently fixed in their final position, for example, with glue. For protection against the environment, the support and the components mounted on the support can be enclosed in a suitable housing.

The wavelength multiplexer module described above has only a few components and can therefore be manufactured at low costs and with a high reliability. The wavelength multiplexer module of the invention has been fabricated on a silicon support base with an area of only 3×7 mm and is therefore significantly smaller than conventional wavelength multiplexer modules. Since the module is assembled simply by providing a suitable support and inserting the components in the support, it can be expected, in particular in view of the rapid advances in etching technology and micromechanics, that these wavelength multiplexer modules can be mass-produced cost-effectively in the near future.

What is claimed is:

1. An optical isolator having a plurality of individual optical components including two wedge-shaped plates (KP1, KP2) of an optically birefringent material and a Faraday rotator (FR) disposed therebetween, characterized in that the plates and the Faraday rotator are arranged on a support (TR) provided with a recess and that the wedge-shaped plates and the Faraday rotator are inserted in the recess (A) so as to be passively adjusted through stops, wherein the stops are in the form of straight edges including boundary surfaces of the recess and wherein each individual optical component has four side surfaces such that each individual optical component makes contact at at least two opposite side surfaces adjoiningly with two boundary surfaces of the recess and further makes contact at at least one different side surface adjoiningly with one other optical component.

2. An optical isolator according to claim 1, wherein
   a) the support (TR) is made of silicon,
   b) the recess (A) in the support has a flat bottom, and
   c) the recess is fabricated by etching.

3. An optical isolator according to claim 2, comprising a first and a second lens (L1, L2), with the wedge-shaped plates (KP1, KP2) and the Faraday rotator (FR) arranged between the first and the second lens.

4. An optical isolator according to claim 3, wherein two additional wedge-shaped plates (KP21, KP22 in FIG. 2) of an optically birefringent material and an additional Faraday rotator (FR2) are inserted in the recess (A), the additional components (KP21, KP22, FR2) forming a second optical isolation stage.

5. An optical isolator according to claim 2, comprising a first and a second lens (L1, L2), with the wedge-shaped plates (KP1, KP2) and the Faraday rotator (FR) arranged between the first and the second lens.

6. An optical isolator according to claim 5, wherein two additional wedge-shaped plates (KP21, KP22 in FIG. 2) of an optically birefringent material and an additional Faraday rotator (FR2) are inserted in the recess (A), the additional components (KP21, KP22, FR2) forming a second optical isolation stage.

7. An optical isolator according to claim 1, wherein the plates and the Faraday rotator are arranged adjoiningly so as to have a point symmetry.

8. A wavelength multiplexer module comprising:
   A) an optical isolator having a plurality of individual optical components including two wedge-shaped plates (KP1, KP2) of an optically birefringent material and a Faraday rotator (FR) disposed therebetween, wherein the plates and the Faraday rotator are arranged on a support (TR) provided with a recess and that the wedge-shaped plates and the Faraday rotator are inserted in the recess (A) so as to be passively adjusted through stops, wherein
      a) the support (TR) is made of silicon,
      b) the recess (A) in the support has a flat bottom,
      c) the recess is fabricated by etching, and
      d) the stops are in the form of straight edges including boundary surfaces of the recess, and wherein each individual optical component has four side surfaces such that each individual optical component makes contact at at least two opposite side surfaces adjoiningly with two boundary surfaces of the recess and further makes contact at at least one different side surface adjoiningly with one other optical component;
   and wherein the wavelength multiplexer module further includes a first and a second lens (L1, L2), with the wedge-shaped plates (KP1, KP2) and the Faraday rotator (FR) arranged between the first and the second lens; and
   B) a wavelength filter (WLF in FIG. 2) capable of reflecting light of a first wavelength and transmitting light of a second wavelength.

9. A wavelength multiplexer module according to claim 8, wherein
   a) the light of the first wavelength exits from a first optical waveguide (LWL1 in FIG. 3) and is collimated by a first lens (L1),
   b) the collimated beam impinges on the wavelength filter (WLF) which reflects the collimated beam,
   c) the reflected beam impinges on a first lens (L1) and is subsequently coupled into a second optical waveguide (LWL2), and
   d) wherein the light of the second wavelength exits from the second optical waveguide (LWL2), is collimated by the first lens (L1), passes through the wavelength filter (WLF) and the optical isolator (ISOL) and is focused by a second lens (L2) so as to couple into a third optical waveguide (LWL3).

10. A wavelength multiplexer module according to claim 8, wherein
   a) the light of the first wavelength exits from a first optical waveguide (LWL1 in FIG. 4) and is collimated by a first lens (L1),
   b) the collimated beam impinges on and is reflected by the wavelength filter (WLF),
   c) the reflected beam impinges on a first lens (L1) and is subsequently coupled into a second optical waveguide (LWL2), and
   d) wherein the light of the second wavelength exits from a third optical waveguide (LWL3), is collimated by a second lens (L2), passes through the optical isolator (ISOL) and the wavelength filter (WLF) and is focused by the first lens (L1) so as to couple into a second optical waveguide (LWL2).

11. A wavelength multiplexer module comprising;
   A) an optical isolator, the optical isolator with two wedge-shaped plates (KP1, KP2) of an optically birefringent material and a Faraday rotator (FR) disposed therebetween, wherein the plates and the Faraday rotator are arranged on a support (TR) provided with a recess and that the wedge-shaped plates and the Faraday rotator are inserted in the recess (A) so as to be passively adjusted through stops, wherein
      a) the support (TR) is made of silicon,
      b) the recess (A) in the support has a flat bottom,
      c) the recess is fabricated by etching, and
      d) the stops are in the form of straight edges;
   and wherein the optical isolator has a first and a second lens (L1, L2), with the wedge-shaped plates (KP1, KP2) and the Faraday rotator (FR) arranged between the first and the second lens; and
   B) a wavelength filter (WLF in FIG. 2) capable of reflecting light of a first wavelength and transmitting light of a second wavelength;
   and wherein the wavelength multiplexer module further comprising an optical adjusting element (JE) which is movably arranged in the recess (A) in the support (TR) so that a light beam traversing the optical adjusting element changes its direction when the optical adjusting element is moved.

12. An optical isolator according to claim 11, wherein a) the light of the first wavelength exits from a first optical waveguide (LWL1 in FIG. 4) and is collimated by a first lens (L1), b) the collimated beam impinges on and is reflected by the wavelength filter (WLF), c) the reflected beam impinges on a first lens (L1) and is subsequently coupled into a second optical waveguide (LWL2), and d) wherein the light of the second wavelength exits from a third optical waveguide (LWL3), is collimated by a second lens (L2), passes through the optical isolator (ISOL) and the wavelength filter (WLF) and is focused by the first lens (L1) so as to couple into a second optical waveguide (LWL2).

13. A wavelength multiplexer module according to claim 12, wherein the optical adjusting element (JE) is wedge-shaped.

* * * * *